United States Patent [19]

Punis

[11] 4,020,357

[45] Apr. 26, 1977

[54] SIGNAL PROCESSING FOR PRINT SCANNERS

[75] Inventor: Giancarlo Punis, Sicklerville, N.J.

[73] Assignee: Metrologic Instruments, Inc., Bellmawr, N.J.

[22] Filed: Jan. 29, 1976

[21] Appl. No.: 653,450

[52] U.S. Cl. .................. 250/568; 250/206; 235/61.11 E

[51] Int. Cl.² .................................... G06K 7/10

[58] Field of Search .......... 250/556, 555, 563, 567, 250/226, 208, 568, 569, 206, 214 R; 235/61.11 E; 340/146.3 AG

[56] References Cited

UNITED STATES PATENTS

| | | | |
|---|---|---|---|
| 3,400,368 | 9/1968 | Le May | 340/146.3 AG |
| 3,593,284 | 7/1971 | Frank et al. | 340/146.3 AG |
| 3,593,285 | 7/1971 | Gillmann | 340/146.3 AG |
| 3,723,970 | 3/1973 | Stoller | 340/146.3 AG |
| 3,899,687 | 8/1975 | Jones | 250/568 |

*Primary Examiner*—Alfred E. Smith
*Assistant Examiner*—David K. Moore
*Attorney, Agent, or Firm*—Paul & Paul

[57] ABSTRACT

Laser light scattered from a UPC symbol on a moving web is detected by a photomultiplier, and detection threshold levels and print contrast signals are developed on a time varying analog basis. Since the reflected light includes an ambient component, the "white" and "dark" logical thresholds are developed based on the voltage levels of peak above zero, white to dark as a time variant function, and respective maximum values thereof. When a valid UPC signal is detected, present signal parameters develop print contrast (i.e., white minus dark/white) and produce a gate pulse having a duration proportional to that ratio.

13 Claims, 47 Drawing Figures

Fig.2a Fig.2b Fig.2c Fig.2d Fig.2e Fig.2f Fig.2g Fig.2h

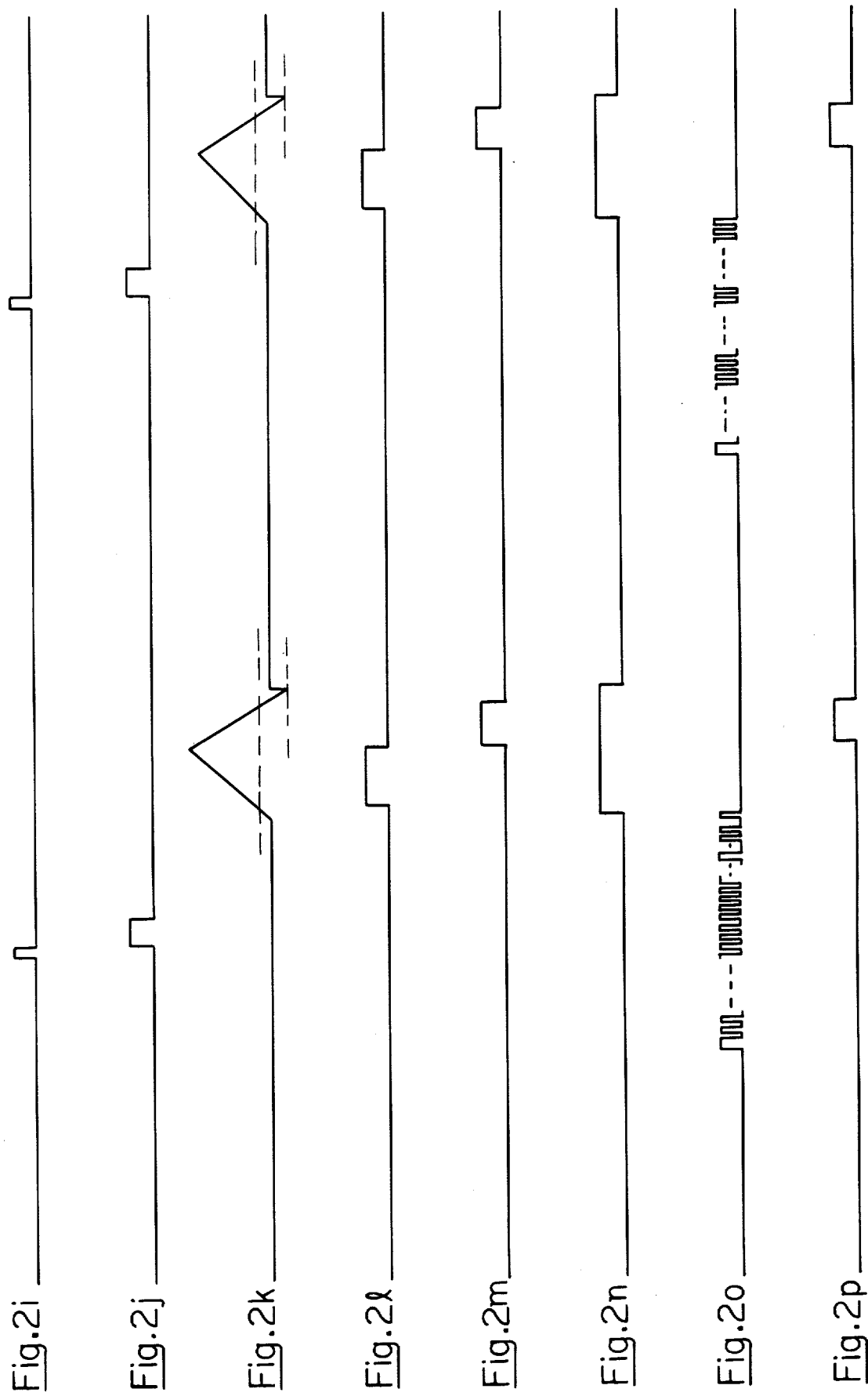

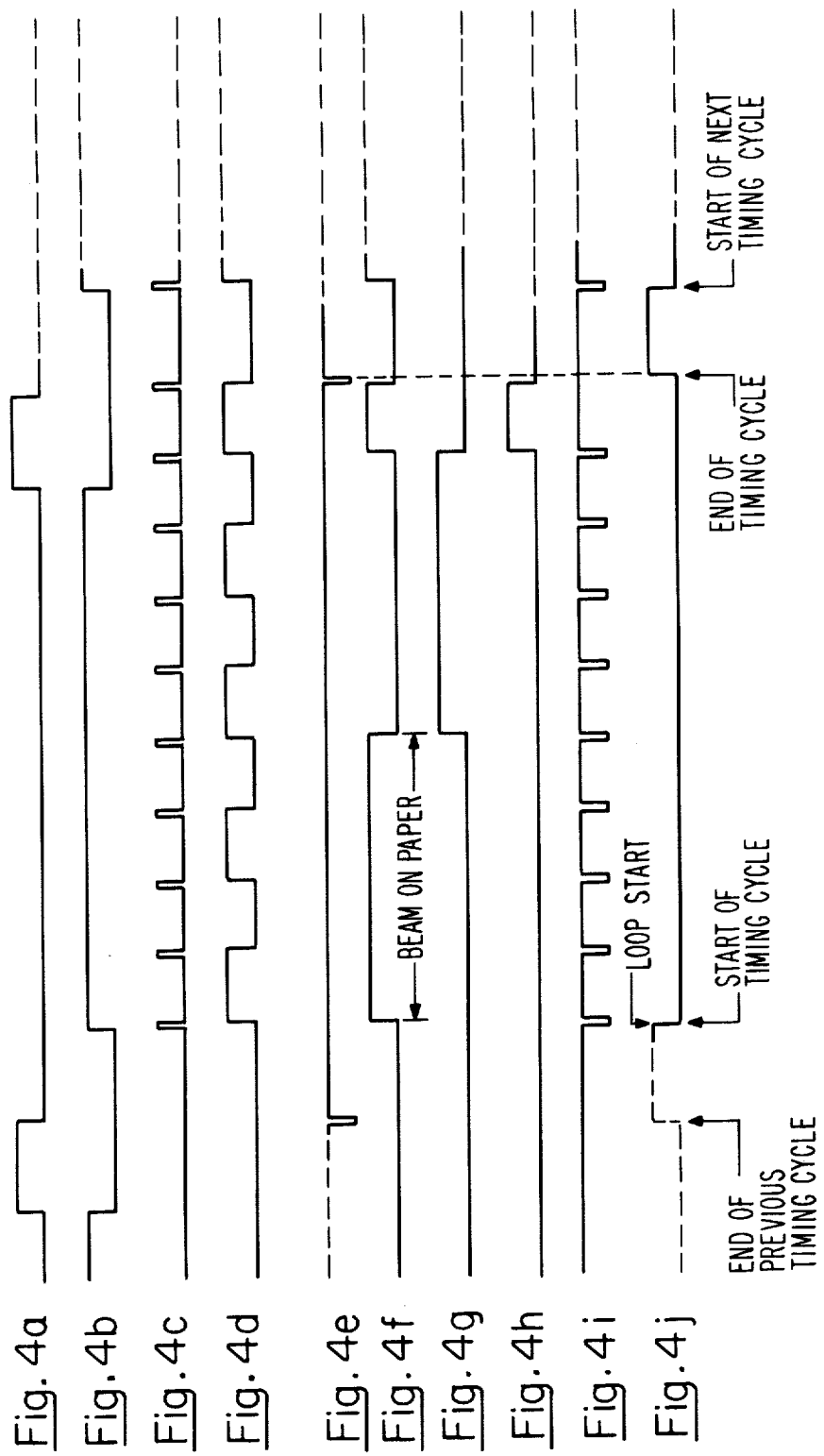

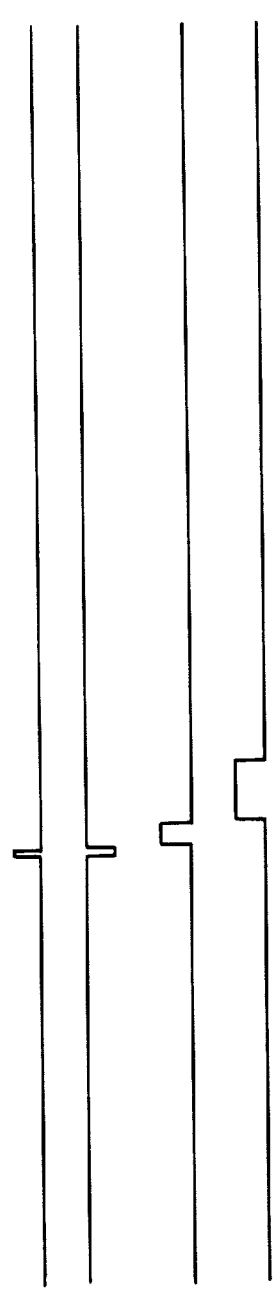
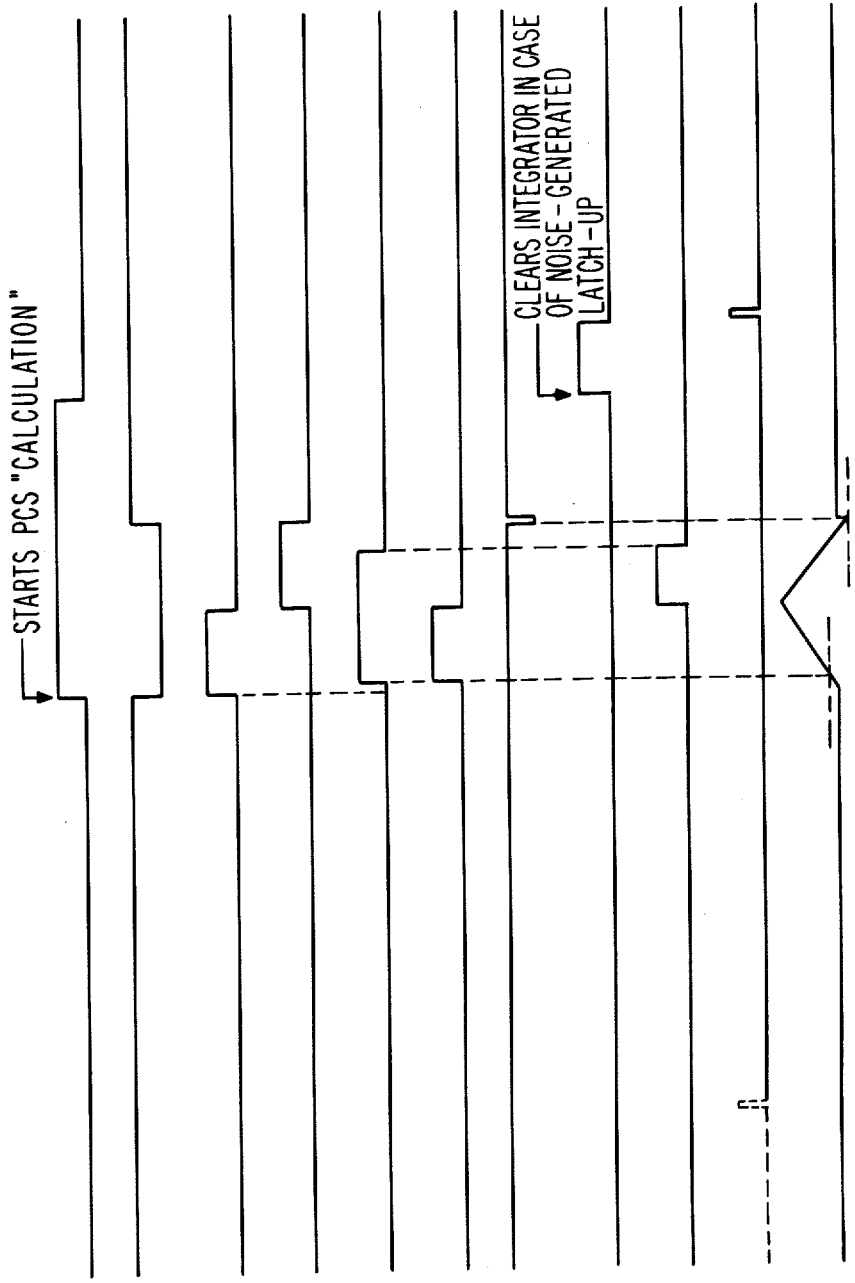

SIGNAL PROCESSING FOR PRINT SCANNERS

BACKGROUND OF THE INVENTION

This invention relates to signal processing apparatus and methods for print scanners. More particularly, it relates to the adaptation of such apparatus and methods to the control of printing apparatus such as web printers, for example for evaluation and validation of Universal Product Code (UPC) symbols.

Recently, the grocery and food processing industries have developed a universal product code whereby each product is assigned a unique designation, in the form of a series of lines and spaces which decode to a multiple digit representation. Each UPC symbol is designed to be unobtrusively printed on the labels of even small items, and each therefore involves a rather high degree of graphic precision. In common methods of use, the supermarket check-out or the like is provided with either a light pen or laser scanner, which is contacted with the symbol on the goods; the symbol thereby is automatically decoded for check-out and inventory purposes.

Use of the UPC symbols has added considerable difficulties for the graphic arts industry. In particular, the necessity of printing accurate, valid UPC symbols has tended to limit the production rate of the printers which generate the labels and packaging stock on which the symbol is printed. UPC related problems have been most acute in two types of printing, specifically those involving an expensive print stock and those in which the stock is crude and therefore not particularly amenable to high precision printing. As an example of the high cost stock, metallic cans for soda, beer, or the like typically cost more than the contents thereof. Hence, although that printing is generally fairly precise, even a relatively small run of invalid UPC symbols will be quite expensive. An example of the relatively crude, poor precision class of material is milk carton stock, which is produced at relatively high speeds with a quality on the border-line of unacceptability from the standpoint of valid UPC symbols. In view of the tremendous production rates involved for these materials, poor UPC quality, unless detected speedily, also results in a loss of considerable stock.

The readability of the UPC symbols, on whatever form of stock, is hindered by a variety of factors. First, since the UPC information is encoded in the form of lines and spaces of varying widths, it is necessary to have a rather sharp demarcation between adjacent lines and spaces. Further, with respect to the wider printed lines, it is desirable to have the ink density be consistent from side to side, and to avoid a thinner application of ink at the center of the bar, which at its extremes might be erroneously recognized as a space. Finally, recognition of the symbol may be impaired by the location of spurious ink blots or other imperfections in the space, which might be erroneously sensed as a bar.

Objects of the present invention, in both its method and apparatus aspects, include provision for scanning the printing stock as it is produced, and for providing signal processing capability whereby overall print quality may be determined and controlled.

It is a further object to provide such functions even when an indeterminate, variable amount of ambient light also is introduced in the scanning operation.

More specific objects of the present invention include establishment of threshold levels whereby bars and spaces of the UPC symbol may be distinguished from one another and from printing imperfections as discussed above, and also for development of a print contrast ratio as an index of overall print quality.

On a still more detailed level, it is an object of the present invention to provide recognition of thresholds on a time variant basis, and which accounts for signal evelope curvature introduced by a rotating scan across a flat surface.

SUMMARY OF THE INVENTION

The present invention involves the development of time variable threshold levels for distinguishing bars and spaces of a scanned UPC signal, based solely on the scattered light received from the scan, even though that light also involves an indeterminate amount of ambient light. Further, the degree of contrast between the bar and space components of the signal is developed directly from the received scan, thereby providing a reference for overall print quality control.

A rotating prism directs a laser beam repeatedly to scan the regions of a moving web having UPC symbols periodically spaced thereon. Reflected light, along with ambient light, is sensed at a photoreceptor and is converted to an electrical signal. From the electrical signal, logic thresholds are developed for comparison with and decoding of the signal itself. An evaluation of the average print contrast per UPC symbol, called the "print contrast ratio", also is developed directly from the electrical signal.

The comparison thresholds for decoding "bars" and "spaces" of the UPC symbol are developed directly from the sensed electrical signal, including reflected light and ambient light. The thresholds are developed continuously on an instantaneous basis, and they thereby vary through time as a function of the electrical signal. This variation is enabled by continuously developing the thresholds based on the instantaneous maximum, minimum, and range variations in the electrical signal. That is, the electrical signal is instantaneously peak detected, subtracted from that peak, and further peak detected, and the resulting values are variously combined to yield instantaneous decoding thresholds for the signal itself.

The print contrast ratio (i.e., PCS) is defined as the ratio of the difference between light reflected from "bars" and that from "spaces", to the actual signal reflected from the "spaces". PCS is calculated once for each scan of a UPC symbol, and represents an evaluation of the overall readability of the corresponding signal. Since PCS is essentially a measure of the quality of the UPC label printing itself, ambient light must be eliminated from consideration. To this end, various maxima and minima are developed from the electrical signal during the scanning of the label itself, and ambient light is evaluated upon completion of the label scan. From these quantities, PCS is calculated directly.

In a preferred embodiment, laser light is passed through a rotating prism onto a moving web from a printer, and reflected light is detected at a photomultiplier and transformed into a time varying voltage signal. Since ambient light is thereby included, detection of peak above zero yields a level of "false white" which includes the ambient. Subtraction of the signal itself from the "false white" peak yields the "black to white" peak to peak, as a function of time, and peak detection thereof yields a representation of true black to white amplitude. Rather than subtract the ambient from the signal, threshold levels are established directly in the black to white range, after which subsequent symbol elements are compared thereto. Print contrast ratio is developed from the black to white and white levels; a ramp integrator translates the ratio into an analog gate pulse.

DESCRIPTION OF THE DRAWINGS

FIGS. 2a through 2p show timing wave forms associated with the embodiment of FIG. 1.

FIGS. 4a through 4j, 5a through 5d, and 6a through 6k show timing wave forms associated with the apparatus of FIGS. 3a through 3d.

DETAILED DESCRIPTION

Since important aspects of the present invention relate to the recognition and processing of signals which relate to UPC symbols, a cursory description of that coding scheme is appropriate. Whether a 12 digit "A version" or a 6 digit "E version" (for smaller packages) is utilized, each digit is represented by four "bars" of varying width, two printed ones (also referred to herein as "dark" or "black" levels, or as "lines") and background, or field ones therebetween (also referred to herein as "light", "white", or "spaces"). The width of each line or space, which may be from one to four times a nominal width, is the information bearing part of the code. In both versions of the code, the symbol commences with an introductory line-space-line-space combination, with each being a single module in width. Recognition of this combination indicates the onset of a UPC signal, and the following lines and spaces decode to the digits of the UPC designation.

As set forth hereinbefore, the signal processing methods and apparatus which embody the principles of the present invention advantageously relate to detection, evaluation, and validation of UPC symbols on output stock of a web printing press or the like. Thus, the UPC symbols to be scanned constitute but a small portion of the overall field (i.e., the labels or cartons being printed), and prior to decoding for validation, it is necessary to discriminate the UPC symbol from the field, to establish thresholds for discriminating lines from spaces on a relative "black-white" basis (regardless of the actual colors being utilized), and to provide the cleaned-up data for processing by a computer, decoder, or the like.

Figures 1, 3E:
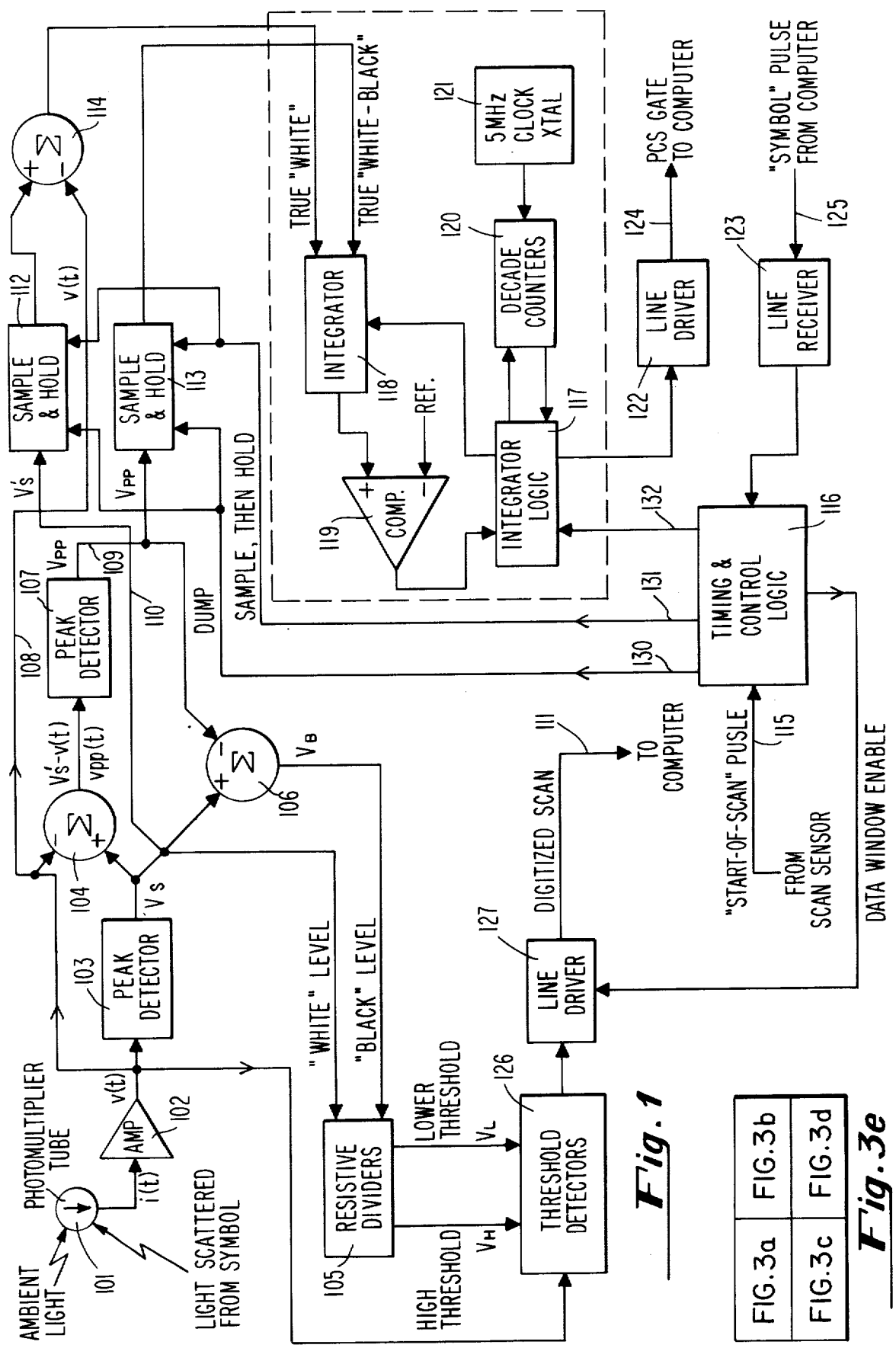
FIG. 1 shows a block diagram of a preferred embodiment of the present invention.

In the embodiment of FIG. 1, a photomultiplier tube 101 is shown intercepting ambient light as well as light scattered from a symbol. The actual scanning apparatus does not constitute a portion of the present invention, and many commonly known systems may be utilized. For the following discussion, it shall be presumed that scanning is conducted in conventional fashion by passing a laser light into a rotating prism, and is thereby coupled onto the web in the path of the passing UPC symbols. The photomultiplier tube 101 is arranged to intercept the light which impinges upon and is scattered from the symbol. Athough the scanner (not shown) and the photomultiplier tube 101 may be enclosed in various protective hoods or the like, it is inevitable that some ambient light will impinge on the photomuliplier tube 101, and the amplitude and periodicity of such light will be variable but relatively unpredictable as a function of time.

Figures 2A, 2B, 2C, 2D, 2E, 2F, 2G, 2H:
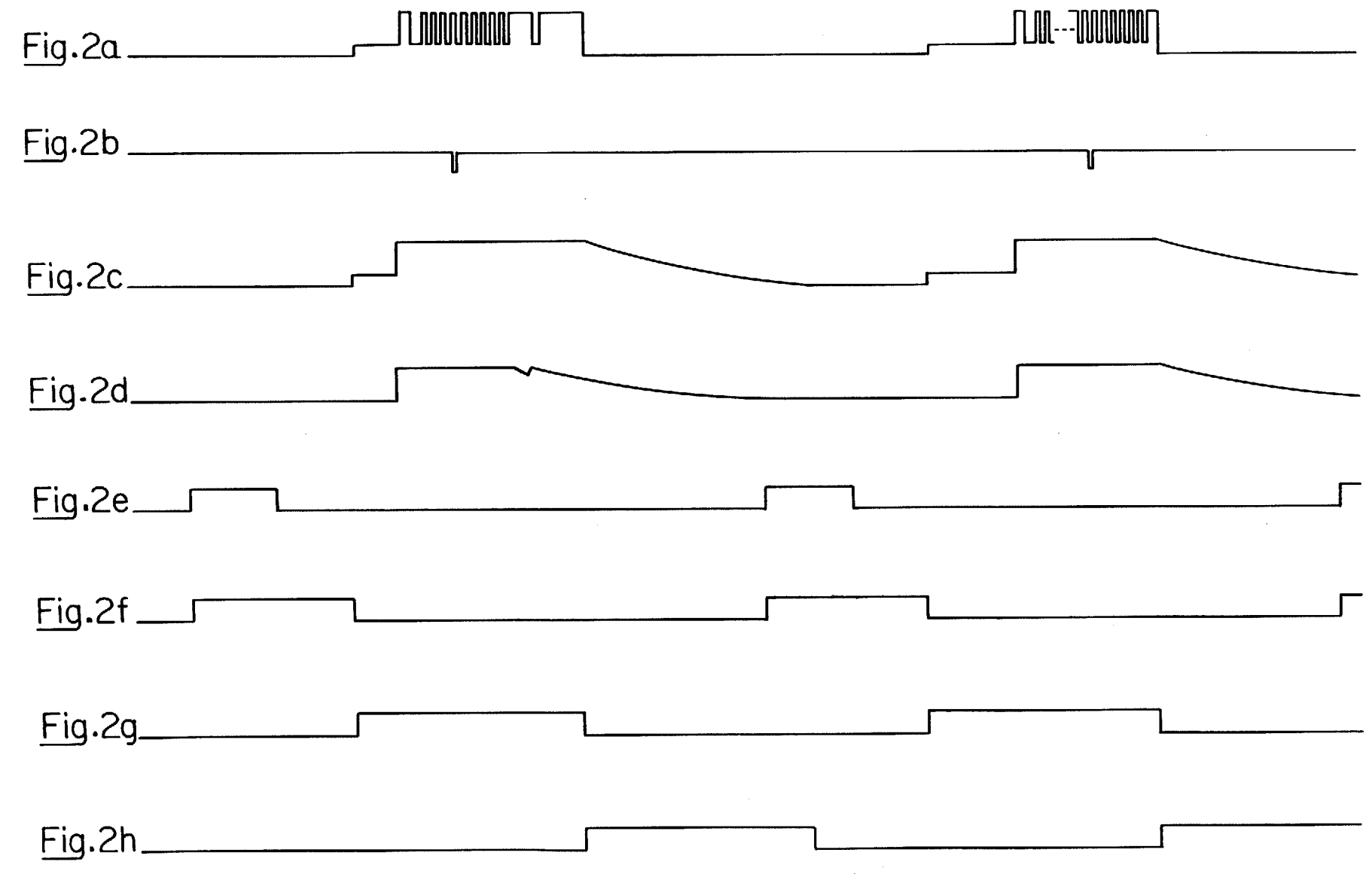

In order to facilitate the symbol recognition process, it is desirable to include a separate photoreceptor just above the passing web, which receptor is energized by the scanning spot from the prism immediately prior to the time when the spot addresses the moving web. Although this feature is not essential, it does tend to shore up the logical possibilities for signal processing, and provides a beneficial warning of the possible onset of a valid UPC symbol. This feature is referred to herein as a "scan sensor", produces a "start of scan" pulse at 115 of FIG. 1, and is shown in FIG. 2e. The timing and control logic 116, which supervises the operation of the FIG. 1 apparatus, is enabled for a predetermined period of time and sequence of operations, which are discussed hereinafter, upon receipt of a start of scan pulse.

The photomultiplier tube 101 produces a current $i(t)$ which has an amplitude proportional to the intensity of light received by the photomultiplier 101. The current $i(t)$ is converted to a voltage $v(t)$ at an amplifier 102. The time varying voltage $v(t)$, an example of which is shown in FIG. 2a, includes the ambient light level as a quiescant state, a "black" level which is slightly higher than the ambient (because even the lines of the symbol are not totally absorbent), and the lightest or "white" level at the peaks. The symbol portions shown in FIG. 2a include rapid rising and falling signals between black and white, together with interference noise or other extraneous graphics data, and are to be processed in accordance with the principles of the present invention.

The voltage signal $v(t)$ is coupled to threshold detectors 126, at which high and low voltage thresholds, indicated as "$V_H$" and "$V_L$," are applied to the symbol for recognition of bars and spaces of the UPC symbol. The threshold detectors 126 produce a binary output signal as shown in FIG. 2o, and are coupled to a line driver 127, which when energized by the timing and control logic 116 as discussed hereinafter, couples the data at 111 to an appropriate decoder or computer, not shown herein.

In accordance with the principles of the present invention, the threshold levels $V_H$ and $V_L$ for the detectors 126 are developed from the $v(t)$ signal itself, and thereby represent self-generated, automatically variable standards for elimination of noise and extraneous data. The signal $v(t)$ is coupled to a peak detector 103, thereby producing a signal $V_s$, as shown in FIG. 2c, which tracks the peak of signal $v(t)$ of FIG. 2a. The peak detector 103 advantageously involves a discharge time constant as shown in FIG. 2c which is long with respect to the bar and space widths of the symbol, but which is short with respect to the intersymbol time, such that the detector 103 develops a new peak $V_s$ for each symbol scan.

At 104, the signal $v(t)$ is itself subtracted from $V_s$, thereby yielding a time varying signal $v_{pp}(t)$, representing the black to white component of the signal. Peak detection at 107 in turn produces the signal $V_{pp}$ as shown in FIG. 2d, which represents the largest "black to white" amplitude thus far occurring for the symbol being scanned. Peak detector 107 also involves a predetermined discharge time constant which is not insubstantial relative to the module widths of the UPC symbol, and which therefore accounts for envelope curvature introduced by the rotating scan on the flat UPC symbol. Although the envelope amplitude is small relative to the black to white amplitude, and therefore is not shown in FIG. 2a, it nonetheless may be a factor under some conditions. Thus, the discharge time for peak detector 107 is preferably adjusted such that the line to line discharge is sufficiently great to match the downward portion of the envelope into which the symbol inevitably is fit. In order to promote rapid response for the threshold calculation in accordance with the embodiment shown, both peak detectors 103 and 107 preferably involve rapid charging characteristics, reaching the peak values within the time duration of a single module (i.e., the first line).

The thresholds $V_H$ and $V_L$ may therefore be calculated based on the information thusly developed, even though ambient light is included. In particular, if voltage $V_s$ from peak detector 103 is regarded as the peak white level, the difference between $V_s$ and $V_{pp}$ may be utilized for calculation at 106 to yield $V_b$, or the minimum black level. It is undesirable, however, to utilize those quantities directly as thresholds. In particular, the thresholds are advantageously off-set from the peak white and black levels by predetermined amounts, and thereby to insure accurate decoding. The scaling of the white level to the high threshold $V_H$, and the black level to the lower threshold $V_L$ is advantageously accomplished at respective independent resistive dividers 105, and the thresholds are thence coupled to the detectors 126. Since the thresholds $V_H$ and $V_L$ are dependent on $V_s$ and $V_{pp}$, and thereby in turn upon amplitude changes in $v(t)$, the thresholds will automatically be adjusted during scanning of a given UPC symbol, as required, and certainly between successive symbols. In a preferred embodiment $V_L$ is 25% and $V_H$ is 75% above $V_b$ toward $V_s$.

Another function provided by the embodiment of FIG. 1 is provision for print contrast ratio (PCS) which is defined as the difference between true white and true black levels relative to the true white level. The ambient light in the signal must therefore be eliminated from this consideration, and in accordance with the embodiment shown this is accomplished by calculating PCS whenever the scan is not impinging upon the symbol. That is, at such time, the signal $v(t)$ from amplifier 102 will represent only the ambient, and may be subtracted accordingly. Hence, although PCS is developed at integrator 118, in conjunction with its associated functional blocks as discussed hereinafter, calculation of PCS also involves a timing operation which occurs at sample and hold circuits 112 and 113, under control of the timing and control logic 116. Essentially, the procedure is to clear the sample and hold circuits 112 and 113 during the scan, and then respectively to sample and hold the quantities $V_s$ and $V_{pp}$ as they are developed during the scanning. Those values are maintained at 112 and 113 until the scanning is complete, at which time the signal $v(t)$ merely constitutes ambient light, and which therefore may be subtracted from the white level $V_s$ to yield a true white level for purposes of PCS. $V_{pp}$ constitutes the true white minus black differential, so that the information then coupled to integrator 118 is sufficient for development of the print contrast ratio.

Prior to detailed discussion of the timing of the PCS calculation, it is appropriate to consider the operation of the so-called "computer" or decoder shown in FIG. 1 as having interconnection at terminals 111, 124, and 125. In fact, that apparatus does not constitute an integral aspect of the present invention, and may be embodied by any of the variety of UPC symbol decoders which are known. Further, the present invention is independent of whether the decoding occurs by virtue of a hard-wired system, or a general or special purpose unit actuated by software. The only decoder attributes utilized in conjunction with the apparatus of FIG. 1 relate to recognition of the first line-space-line-space combination and the first digit at the commencement of UPC scan, and the production at 125 of a so-called "symbol" pulse in response thereto. Hence, as the introductory combination is decoded at 126 and passed to the computer via 111, the recognition of an upcoming symbol is designated by a pulse at 125, which is coupled via the line receiver 123 to actuate the timing and control logic 116 as follows. The symbol flag is shown as a negative going pulse in FIG. 2b, and its receipt at 116 immediately actuates a pulse at 130 which clears the sample and hold circuits 112 and 113. The so-called "dump" pulse at 130 is shown in FIG. 2i. Immediately following the dump pulse, a sample and hold pulse, as shown in FIG. 2j, is produced at 131 causing the sample and hold circuits 112 and 113 respectively to assume the prevailing values of $V_s$ and $V_{pp}$. These are the values which will be utilized for the PCS calculation whenever $v(t)$ represents only the ambient light factor.

This timing in turn is accomplished as follows. Upon receipt at 115 of a scan sensor pulse by timing logic 116, production thereby of a pulse of predetermined duration as shown in FIG. 2f commences, at the termination of which the data window enable signal of FIG. 2g is produced, also at 116, to energize the line driver 127 to couple scanned data to the computer or decoder. The duration of the data window enable pulse of FIG. 2g is selected in accordance with the scanning and web rates, and envelopes the actual symbol scan portion of FIG. 2a. By the termination of the data window enable pulse of FIG. 2g, the sample and hold operation at 112 and 113 as described above is completed, such that a PCS enabling pulse such as shown in FIG. 2h may be coupled from the timing and control logic 116 to the integrator logic 117 for commencement of PCS calculation. At this time, $v(t)$ includes only the ambient light component.

The embodiment of FIG. 1 computes PCS based on a dual ramp integrator, with the output at 124 being a pulse of predetermined amplitude having a duration proportional to the print contrast ratio.

Dual slope integration conventionally involves charging a capacitor from a datum level with one signal for a predetermined period of time, and then discharging it with another signal until predetermined threshold levels have been reached. The time required for the discharge operation therefore provides a representation of the former signal divided by the latter. In FIG. 1, the print contrast ratio is achieved by charging the integrator 118, for 100 microseconds from a reference level provided at 119, with the true white minus black signal from sample and hold 113, and discharging it with the true white signal from 114, until the integration voltage reaches the same reference threshold as determined at the comparator 119. The time of the discharge operation is developed with precision at decade counters 120 which accumulate pulses from a 5 MHz crystal clock 121.

This operation my be better understood with reference to FIGS. 2h and 2k through 2n. As set forth hereinbefore, the PCS enable pulse of FIG. 2h is conveyed from timing and control logic 116 to the integrator logic 117, which initiates integration at 118 of the true white minus black signal. This positive integration is represented by the upward slope of the signal in FIG. 2k. The integrated signal at 118 is compared with a reference at 119, the results of which are coupled back to the integrator logic 117. As soon as the integration voltage at 118 exceeds the comparison reference at 119, the integrator logic initiates the counting at 120 of pulses from the clock 121. Five hundred counts or 100 microseconds later, the integrator logic 117 is triggered by the accumulator to shift the integrator 118 to begin negative integration based on the true white signal from 114. The 100 microsecond count is depicted in FIG. 2l, at the termination of which the negative going ramp signal commences in FIG. 2k.

Simultaneously with the commencement of negtive integration at 118 based on the true white signal, the accumulator of the decade counters 120 begins counting pulses from the clock 121 during the negative integration. This latter count at 120 is depicted as establishment of a gate pule as shown in FIG. 2m. Whenever the negative integration of the true white signal at 118 is shown at comparator 119 once more to be equivalent to the reference threshold level, the integrator logic terminates the accumulation of counters 120, and thereby terminates the PCS gate pulse of FIG. 2m. The number of counts developed during the negative integraion, and correspondingly the time duration thereof, represents the print contrast ratio, and is conveniently conveyed via a line driver 122 to the computer or decoder as may be required. Integration conveniently is continued until the integrator 118 voltage reaches the negative of the reference level, whereupon the integrator logic 117 forces the integrator 118 back to zero, as shown in FIG. 2n, and the system is prepared for the next cycle.

Figure 3A:
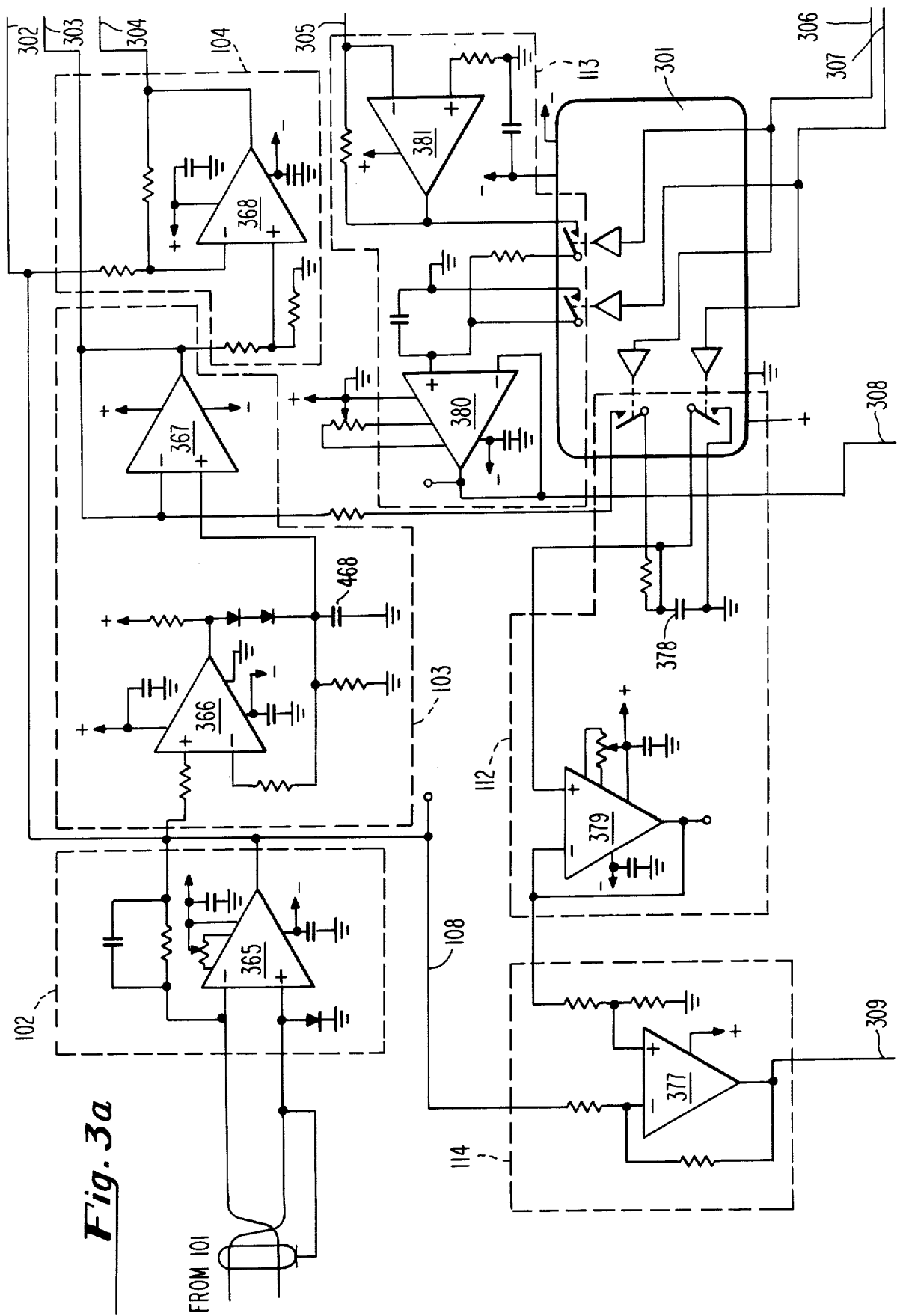
FIGS. 3a through 3d, when juxtaposed as shown in 2e, set forth a schematic representation of a preferred embodiment of the FIG. 1 apparatus.
Figure 3B:
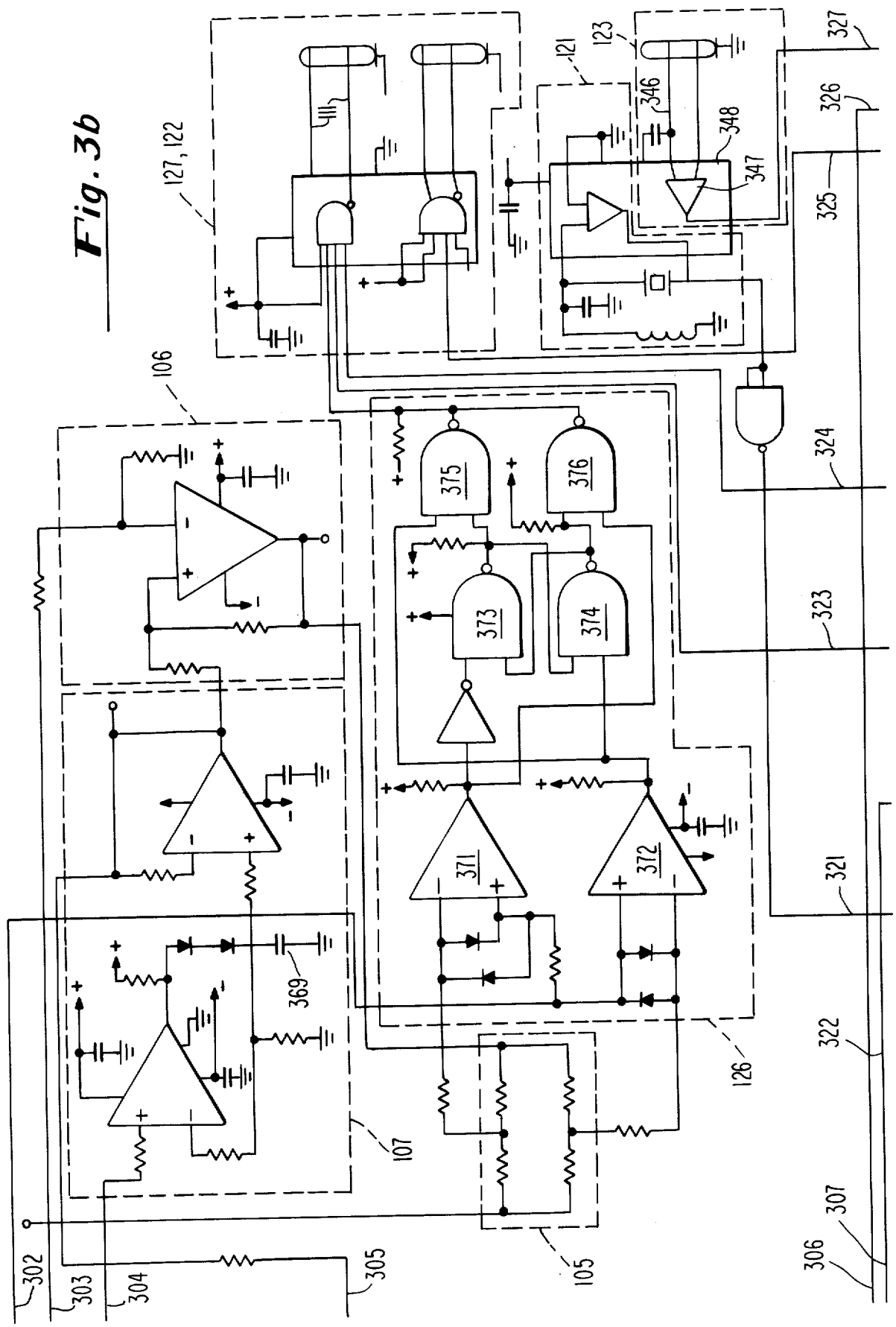
Figure 3C:
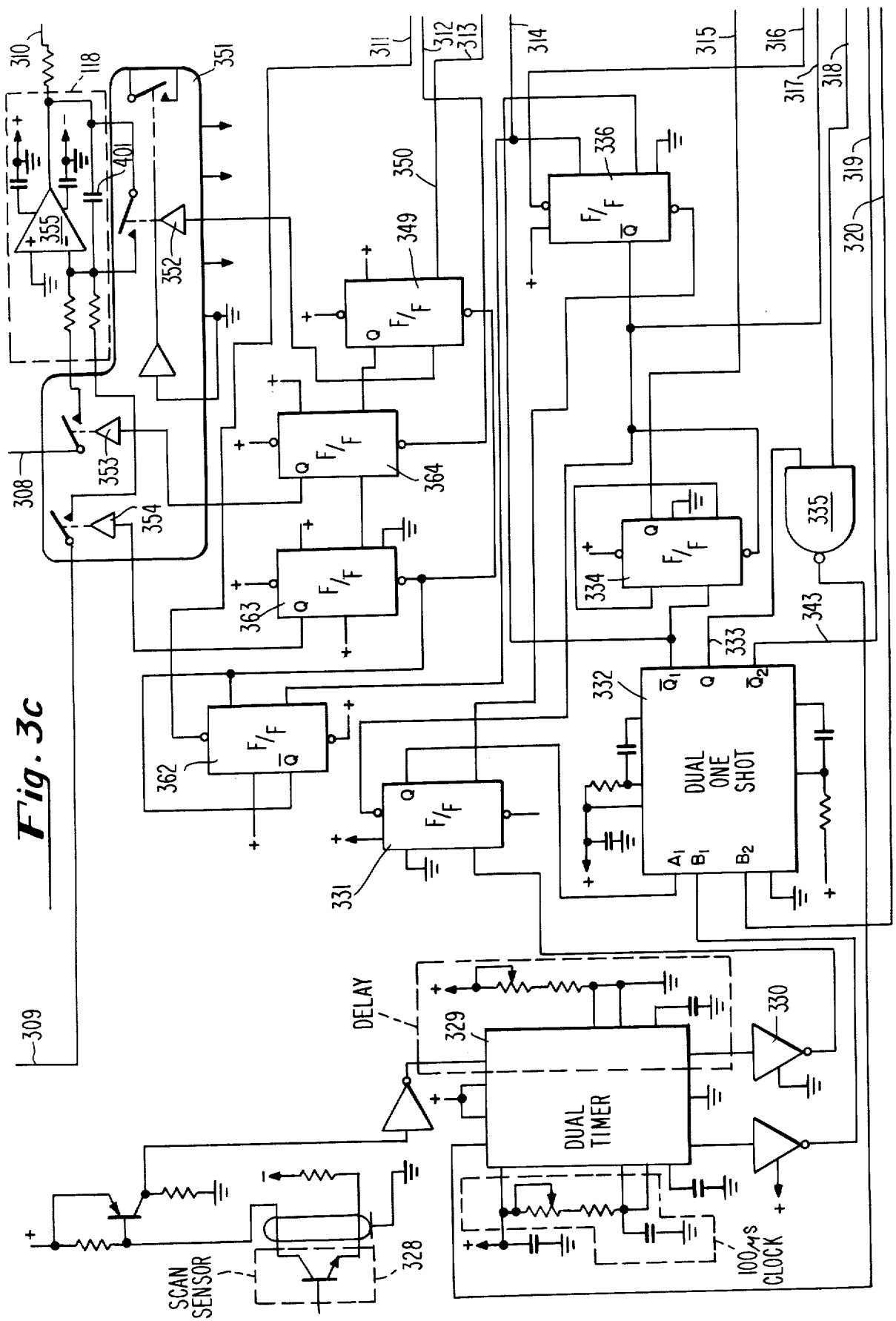
Figure 3D:
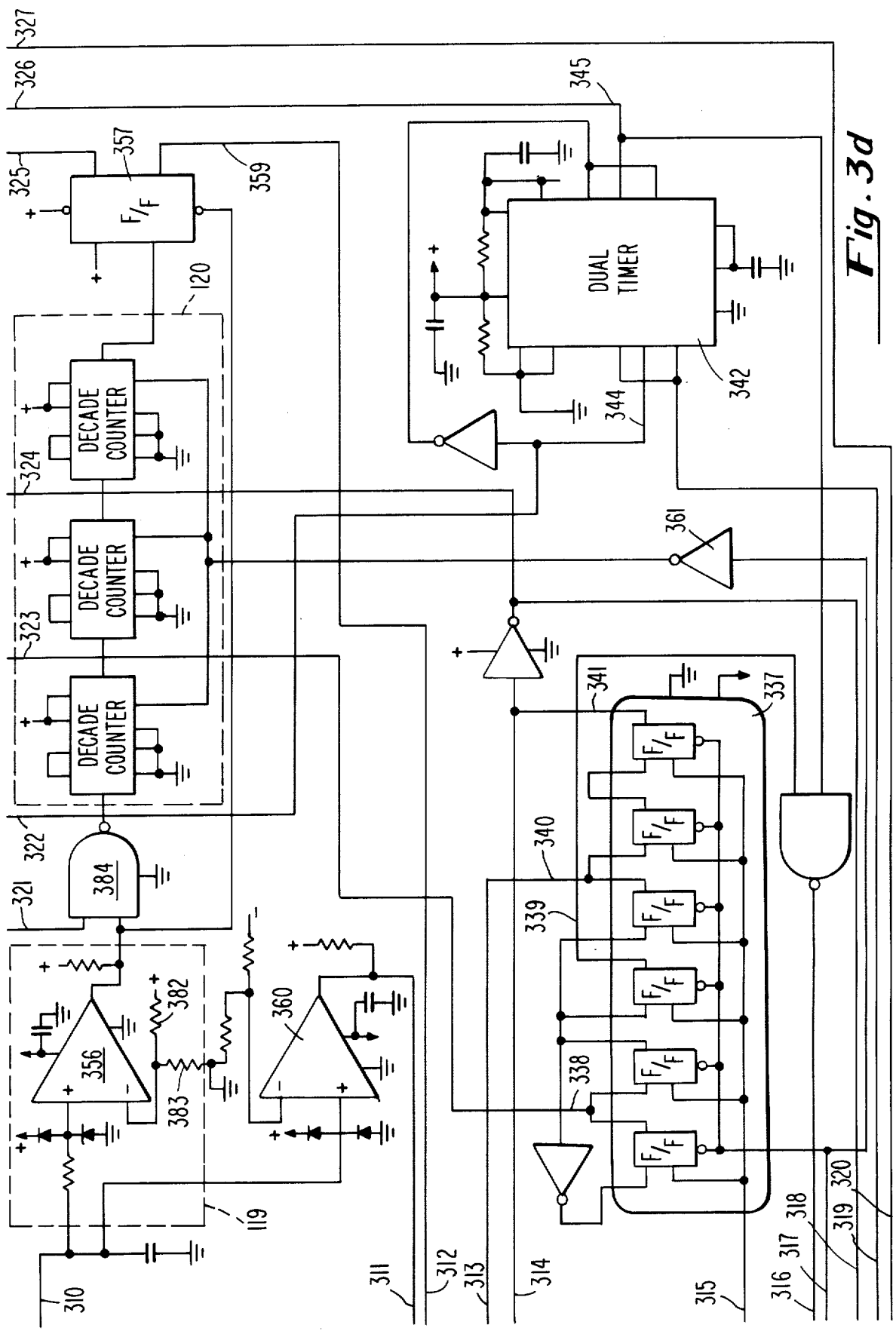

FIGS. 3a through 3d, when connected as set forth in FIG. 3e, show a detailed schematic representation embodying the block diagram of FIG. 1. That is, FIGS. 3a and 3b are interconnected at lines 302 through 307, FIGS. 3a and 3c are interconnected at lines 308 and 309, FIGS. 3c and 3d are interconnected at lines 310 through 320, and FIGS. 3b and 3d are interconnected at lines 321 through 327. The schematic of FIGS. 3a through 3d is composed of standard buildng block elements, including amplifiers, buffers, gates, flip flops, and the like. In addition, three larger special purpose integrated circuits 329, 332, and 342 are included as set forth herinafter, but those too represent commercially available logic elements. Accordingly, the embodiment of FIGS. 3a through 3d provides a level of detail customarily utilized in maintenance manuals and the like by those of ordinary skill in the art.

In FIGS. 3a through 3d, functional blocks of FIG. 1 are shown wherever possible in phantom and are numbered accordingly. The circuitry not enclosed in phantom in the Figures generally relates to the embodiment of the timing and control logic 116 and the integrator logic 117 of FIG. 1. In order to facilitate understanding of the operation of the apparatus of FIGS. 3a through 3d, timing waveforms of FIGS. 4a through 4j, 5a through 5d, and 6a through 6k are included, as described hereinafter.

In FIG. 3a, the current from the photomultiplier is delivered to an operational amplifier 365, with its associated biasing circuitry, and thereby is converted to a voltage signal $v(t)$ at 108. The amplifier 365, as well as the other operational amplifiers herein described, unless characterized otherwise, is embodied as any of a large variety integrated circuit chips commercially available.

The signal from amplifier 365 is coupled to the positive input of a voltage comparator, which involves a feedback connection as shown and which drives a buffer 367. The signal from buffer 367 represents the peak signal $V_s$. Another amplifier 368 performs the function of the adder 104 of FIG. 1, and subtracts the voltage signal $v(t)$ from amplifier 365 from the peak signal $V_s$. Another peak detector 107 is configured identically to detector 103. That is, it will be recalled that peak detectors 103 and 107 have different charge and discharge time cnstants in accordance with the characteristics of the signal which they are intended to develop. In each case, selection of the respective capacitors 468 and 369, in conjunction with associated resistors and diodes, will control the discharge characteristics. The adder 106 is configured identically to adder 104, such that the "white" level and "black" levels which are delivered to the resistive dividers 105 are developed. Upper and lower thresholds are thereby delivered to the respective negative inputs of amplifiers 371 and 372, while the voltage signal $v(t)$ from amplifier 365 is appropriately coupled to the positive inputs of amplifiers 371 and 372. Assuming the respective thresholds are satisfied, one or the other of amplifiers 371 and 372 will energize the flip flop consisting of NAND gates 373 and 374, and in turn inhibit an appropriate output NAND gate 375 or 376. In turn, the digitized scan signal is produced, and is coupled to the line drivers 127.

The voltage signal $v(t)$ from amplifier 365 also is coupled via line 108 to an adder 114, which includes yet another amplifier 377. The other input to adder 114 is the sampled and held "white level" $V_s$ from 112. As may be seen, the sampling portion of the sample and hold 112 results from the use of two of four switches of the guadruple analog gate 301 (which is embodied, for example, as an integrated circuit chip commercially available for Natl. Semiconductor Corportion under the designation AH0015CD), and the holding operation occurs by virtue of a capacitor 378 and an associated, suitably biased amplifier 379. The "white minus black" level from the peak detector 107 is coupled to a similar sample and hold circuit 113, which includes an amplifier 380 and utilizes two more switches from the quadruple gate 301, and which additionally includes an inverting amplifier 381. Thus, the true white and true white minus black signals which in FIG. 1 are coupled to the integrator 118, are represented at lines 308 and 309 of FIG. 3a.

The integrator 118 is embodied as an amplifier 355 with associated feedback circuitry as shown, wherein capacitor 401 affords the integrating charge storage function. It will be recalled from the foregoing discussion that the input of the integrator 118 is switched at different times between the true white and the true white minus black signals, and this switching function is afforded at elements 353 and 354 of yet another quadruple analog gate 351. The associated logic shown in FIGS. 3c and 3d regulates this timing, along with other similar processes, and is described in detail hereinafter.

Another switch 352 of quadruple gate 351 embodies the interconnection shown in FIG. 1 between the integrator logic 117 and the integrator 118 (it is to be noted that the circuitry of FIGS. 3c and 3d interrelates with one another generally to comprise the integrator logic 117 and the timing and control logic 116 of FIG. 1). The remaining switch of 351 of unused.

The integrated voltage is coupled via 310 to the positive input of a comparator amplifier 356, the negative input of which is provided with a reference voltage from a resistive divider 382 and 383. The output of amplifier 356 is coupled to one input of a NAND gate 384, the other input 321 of which is energized by pulses from a crystal controlled clock 121 in FIG. 3b. Hence, NAND gate 384 couples pulses from the crystal controlled clock 121 to a triple decade counter 120 which counts to 1000. Each of the several elements shown for the counter 120 advantageously is a conventional integrated circuit decade counter (e.g., "7490"). The output of the final stage of the counters 120 is coupled to the C input of a flip flop 357, the reset terminal of which is energized when no signal is forth-coming from the comparator-amplifier 119. The Q output of flip flop 357 energizes a portion of the output line driver 122 (i.e., line 124). The reset, or $\bar{Q}$ output of flip flop 357 is coupled via line 359 to the timing and logic circuitry, as described hereinafter. Hence, the flip flop 357 affords a portion of the timing and integrator logic functions as described hereinbefore.

In partial summary, FIGS. 3a and 3b, and the foregoing aspects of FIGS. 3c and FIG. 3d, relate to the operational elements of FIG. 1, with the exception of the timing and control logic 116 and the integrator logic 117. Those functions are represented by the balance of the apparatus of FIGS. 3c and 3d, which may be better understood when considered in conjunction with FIGS. 4a through 4j, 5a through 5d, and 6a through 6k. More particularly, FIGS. 4a through 4j set forth timing waveforms in conjunction with the timing and control logic, FIGS. 5a through 5d show timing waveforms for the sample and hold timing, and FIGS. 6a through 6k show timing waveforms associated with the integration logic.

The scan sensor which indicates a forthcoming scan is represented by a transistor 328, advantageously a phototransistor, and the waveform of FIG. 4a represents the collector voltage of transistor 328. Appropriately scaled and inverted, the signal from the scan sensor 328 is applied to one half of a dual timer integrated circuit 329. The timer 329, which preferably is embodied as an integrated circuit commercially available under the designation "556", has one half adapted to produce a predetermined delay for the pulses from scan sensor 328, which delayed pulses are coupled to an inverter 330 and thence to the c input of a flip flop 331. The output of inverter 330 is represented by the waveform of FIG. 4b.

The other half of the dual timer 329 is configured to produce a 100 microsecond clock signal, which is triggered by NAND gate 335.

The 100 microsecond clock signal from timer 329 is inverted and is coupled to one half of a dual one shot circuit 332, which advantageously is embodied as an integrated circuit available under the commercial designation "74123". The Q output 333, which is represented at FIG. 4c, is thereby coupled to a NAND gate 335, the other input of which is supplied via line 318 in a rather complex feedback arrangement from the output 341 of the last flip flop of a shift register 337. The corresponding $\bar{Q}_1$ output of one shot 332 is coupled both to flip flop 336 and to flip flop 334. Correspondingly, the waveform of FIG. 4d represents the Q output of flip flop 334, and FIG. 4e represents the Q output of flip flop 336, which in turn operates the "clear" input of flip flop 331.

The waveform of FIG. 4d is coupled to the C inputs of each of the flip flops of module 337 (which is embodied as an integrated circuit commercially available under the desigantion "74174"). The Q output 338 of the first such flip flop is represented by FIG. 4f, and is coupled to energize the line driver 127, thereby enabling conveyance of data to the computer, as described hereinbefore. The flip flops of 337 are interconnected in iterative fashion as shown, and the Q outputs 339 and 340 of the third and fourth flip flops of 337 are represented as the waveform of FIG. 4g. The Q output 341 of the last flip flop 337, as discussed hereinbefore, is shown in FIG. 4h. The output of NAND gate 335, which triggers the 100 microsecond clock of timer 329, is shown in FIG. 4i. Finally, the flip flops of 337, as well as the counters 120, are cleared from the $\bar{Q}$ output of flip flop 336. That clearing signal is inverted at 361, the output waveform of which is represented at FIG. 6j.

In partial summary, the timing and control logic thus-far described, which is characterized as set forth by the timing waveforms of FIG. 4a through 4j, regulate the timing of the apparatus of 3a through 3d, in accordance with the foregoing description of such functions in conjunction with FIGS. 1 and 2a through 2p.

As set forth hereinbefore, when the computer recognizes the onset of a symbol, a pulse is coupled to the line receiver 123 via line 125. FIG. 5a shows such a timing waveform, as represented at the negative input 346 of a amplifier 347. In turn, a pulse is produced to energize the second half of the dual one shot 332, and thereby to produce the waveform of FIG. 5b at the $\bar{Q}_2$ output terminal 343 of one shot 332. This signal energizes the dual timer 342, which is wired to produce the waveform of FIG. 5c at output line 344, which in trun controls the "dump" operation at 301 as described hereinbefore. The signal at output terminal 344 of timer 342 is inverted and fed back to the input of the other half of timer 342, and produces the sampling signal of FIG. 5d at the second output terminal 345. The waveform of FIG. 5d is utilized, as described hereinbefore, to control the sampling and hold operation at 112 and 113, and also, as appropriate, to interrupt the timing operation, if ever a pulse at 345 extends into the PCS interval, thereby avoiding an erroneous PCS reading. Hence, the second dual timer 342 provides the sample and hold timing operation as previously attributed to the FIG. 1 apparatus.

The integration operation is actuated as follows. A series of flip flops 362, 363, 364, and 349 are interconnected with each other and with the balance of the circuitry as shown, and the waveform of FIG. 6a, which enables the PCS calculation, is produced as set forth hereinbefore by the fourth flip flop 337. The waveform of FIG. 6a, which is coupled to the C input of flip flop 349, therefore is identical to the waveform of FIG. 4g. The $\bar{Q}$ output of flip flop 349 is shown in FIG. 6b, and enables the integrator 118 by controlling switch 352 as described hereinbefore. The Q output of flip flop 364 is shown in FIG. 6c, and controls switch 353 appropriately to couple the true "white minus black" signal from sample and hold 113 to the integrator 118. Likewise, the Q output of flip flop 363 is shown in FIG. 6d, and controls switch 354 to couple the true "white" to integrator 118.

The output signal from comparator-amplifier 356, which energizes NAND gate 384 as set forth hereinfore, is shown in FIG. 6e, and the waveform at the $\overline{Q}$ output 359 of flip flop 357, which clears flip flop 364, is shown in FIG. 6f. The voltage from the integrator 118 is also coupled to the positive input of an amplifier 360, the negative input of which is provided with a reference voltage from a divider, thereby establishing at its output, as shown in FIG. 6g, a comparison with the references which enable the threshold comparisons and timing of the ramp integrations. The output of amplifier 360 clears flip flop 362. The C input of flip flop 362 is shown in FIG. 6h, and constitutes the FIG. 4h signal described hereinbefore from the output 341 of the last flip flop of 337. The $\overline{Q}$ output of flip flop 362 clears flip flops 349 and 363 as shown.

The Q output of flip flop 357, as described hereinbefore, regulates the line drivers 122, via line 325, and is shown in FIG. 6i. Also as set forth hereinbefore, the output of inverter 361, which clears the accumulator 120, is shown in FIG. 6j, and to interrelate the foregoing functions, the output of amplifier 335 of the integrator 118 is shown in FIG. 6k.

In summary, FIGS. 3a through 3d set forth a preferred configuration for the block diagrammatic embodiment of FIG. 1.

It is to be understood that the foregoing is intended as illustrative of the principles of the present invention, and that numerous alternatives may occur to those of ordinary skill in the art without departuring from the spirit or the scope thereof.

I claim:

1. Apparatus for automatically developing comparison thresholds for detecting data in optical scanning systems comprising:
    a. means for developing a first signal proportional to a scanning signal;
    b. means for detecting peak excursions in said first signal;
    c. means for developing a difference signal by subtracting said first signal from said peak excursions;
    d. means for detecting peak excursions in said difference signal;
    e. means for developing a second difference signal by subtracting said latter peak excursions from said former peak excursions; and
    f. means for producing upper and lower comparison thresholds by scaling said former peak excursions and said second difference signal by respective first and second factors.

2. Apparatus as described in claim 1 wherein said latter means for detecting peak excursions includes means for compensating for envelope curvature of said first signal by providing a predetermined discharge time constant between successive peaks of said first signal.

3. Apparatus as described in claim 2, and adapted to scan predetermined symbols of plural bars occurring at predetermined spacing on a moving web, wherein said means for compensating includes capacitive discharge means having a discharge time constant substantially similar to the rate of decrease of envelope curvature in said first signal.

4. Apparatus as described in claim 1, adapted to scan UPC symbols occurring periodically on a moving web, wherein said former means for developing peak excursions comprises capacitive discharge means having a predetermined discharge time which is long relative to bars and spaces of UPC symbols, but short with respect to intersymbol time.

5. In a laser scanning system for monitoring and evaluating UPC symbols occurring periodically on a moving web, a method of detecting UPC data comprising:
    a. developing a first signal proportional to light scattered from said web plus ambient light;
    b. peak detecting said first signal, thereby developing a first peak signal;
    c. developing a first difference signal between said first signal and said first peak signal;
    d. peak detecting said first difference signal, thereby developing a second peak signal;
    e. developing a second difference signal between said first peak signal and said peak signal;
    f. processing said frist peak signal and said second difference signal to yield respective upper and lower threshold levels; and
    g. comparing said first signal with said thresholds, producing a logical 1 when said first signal exceeds said upper threshold and producing a logical 0 when said first signal falls below said lower threshold.

6. A method as described in claim 5 wherein said latter peak detecting step includes decaying said first peak signal by a predetermined rate to compensate for envelope curvature introduced in said first signal by passage of a rotating scan over a flat web.

7. A method as described in claim 5 wherein said former peak detecting step includes decaying said second peak signal at a rate small relative to the inter-line scan time of said UPC symbol, said decaying being substantially total with respect to the intersymbol scan time.

8. In a laser scanning system for identifying and evaluating UPC symbols printed on a moving web by periodically scanning said web, apparatus for evaluating the print quality of said symbols, comprising:
    a. means for developing a first signal proportional to light scattered from said web, plus ambient light;
    b. means for peak detecting said first signal;
    c. means for developing a signal representative of the maximum deviation in said first signal between bars and spaces of a scanned UPC symbol;
    d. means for holding respective sampled values of the peak detected first signal and said signal representative of the maximum deviation;
    e. means energized between successive scans, for developing the difference between said sampled value of the peak detected first signal, and the present value of said first signal; and
    f. means for dividing said sampled value of said signal representative of the maximum deviation by the developed difference.

9. Apparatus as described in claim 8 wherein said means for developing a signal representative comprises:
    a. means for developing a second difference signal between detected peaks in said first signal, and said first signal;
    b. means for peak detecting said second difference signal, thereby producing said signal representative of maximum deviation.

10. Apparatus as described in claim 8 wherein said means for dividing comprises:

a. an integrator;
b. means for charging said integrator for a predetermined time from a datum level by said signal representative of maximum deviation;
c. means for discharging said integrator from the level achieved by said means for charging, to said datum level, by the difference between said sampled value of the peak detected first signal and said present value of said present signal; and
d. means for timing said means for discharging, the duration of said timing corresponding to an evaluation of print contrast of said UPC symbols.

11. In a laser scanning system for identifying and evaluating UPC symbols printed on a moving web by periodically scanning said web, a method of evaluating print quality of said symbols cmprising the steps of:
  a. developing a first symbol proportional to light scattered from scanning said web, plus ambient light;
  b. peak detecting said first signal to develop a first peak signal;
  c. developing a signal representative of the maximum deviation in said first signal between bars and spaces of a scanned UPC symbol;
  d. holding respective sample values of said first peak signal and of said signal representative of maximum deviation;
  e. evaluating, at a time subsequent to the scanning of a symbol, the difference between said first signal at said time subsequent and said first peak signal from said holding step; and
  f. dividing the sampled value of said signal representative of maximum deviation by said evaluated difference.

12. A method as described in claim 11 wherein said holding step is conducted substantially when the scanning beam is at the center of a UPC symbol, and wherein said evaluating step is conducted when no scanning of the web is occurring.

13. A method as described in claim 11 wherein said step of developing a signal representative of maximum deviation comprises:
  a. developing a differential signal between said first peak signal and said first signal; and
  b. peak detecting said differential signal.

* * * * *